(12) United States Patent
Boucké

(10) Patent No.: US 12,280,581 B2
(45) Date of Patent: Apr. 22, 2025

(54) PANEL, IN PARTICULAR A FLOOR, CEILING, OR WALL PANEL; A COVERING CONSTRUCTED BY A MULTITUDE OF SUCH PANELS; AND A METHOD FOR THE RECYCLING OF SUCH A PANEL

(71) Applicant: I4F Licensing NV, Hamont-Achel (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 99 days.

(21) Appl. No.: 18/029,295

(22) PCT Filed: Sep. 30, 2021

(86) PCT No.: PCT/EP2021/076942
§ 371 (c)(1),
(2) Date: Mar. 29, 2023

(87) PCT Pub. No.: WO2022/069629
PCT Pub. Date: Apr. 7, 2022

(65) Prior Publication Data
US 2023/0364885 A1 Nov. 16, 2023

(30) Foreign Application Priority Data
Sep. 30, 2020 (NL) .................................... 2026580

(51) Int. Cl.
*B32B 7/12* (2006.01)
*B32B 3/30* (2006.01)
(Continued)

(52) U.S. Cl.
CPC ............... *B32B 7/12* (2013.01); *B32B 3/30* (2013.01); *B32B 27/40* (2013.01); *B32B 43/006* (2013.01); *C09J 175/04* (2013.01); *E04F 13/0894* (2013.01); *E04F 15/02038* (2013.01); *E04F 15/107* (2013.01); *B32B 2310/0806* (2013.01); *B32B 2607/00* (2013.01);
(Continued)

(58) Field of Classification Search
None
See application file for complete search history.

(56) References Cited

U.S. PATENT DOCUMENTS

| | | |
|---|---|---|
| 2011/0039056 A1 | 2/2011 | Mantle et al. |
| 2018/0030321 A1* | 2/2018 | Tunius .................... A61P 17/02 |
| 2019/0048152 A1* | 2/2019 | Humpal .................... C08J 3/28 |

OTHER PUBLICATIONS

Hohl, "(De)bonding on Demand with Optically Switchable Adhesives", 2019, Advanced Optical Materials, vol. 7, p. 1900230 (25 pages). (Year: 2019).*

(Continued)

*Primary Examiner* — Kim S. Horger
(74) *Attorney, Agent, or Firm* — The Webb Law Firm (57) ABSTRACT

A panel, in particular a floor, ceiling, or wall panel, of a planar design having a top side and bottom side, and multiple side edges, which panel has a structure of laminated layers that are adhered to each other, wherein the laminated layers extend parallel to the plane of the panel, and include a core layer having a lower side and an upper side, and a top layer which is provided on the upper side of the core layer either directly or indirectly, wherein at least two layers of the laminated structure, in particular the top layer and the core layer, are directly or indirectly adhered to each other.

22 Claims, 1 Drawing Sheet

(51) Int. Cl.
  B32B 27/40    (2006.01)
  B32B 43/00    (2006.01)
  C09J 175/04   (2006.01)
  E04F 13/08    (2006.01)
  E04F 15/02    (2006.01)
  E04F 15/10    (2006.01)
(52) U.S. Cl.
  CPC .... *C09J 2301/312* (2020.08); *C09J 2301/408* (2020.08); *C09J 2301/416* (2020.08); *C09J 2301/502* (2020.08); *E04F 2201/0138* (2013.01); *E04F 2201/0153* (2013.01)

(56) References Cited

OTHER PUBLICATIONS

Bandl, "Adhesives for debonding-on-demand: Triggered release mechanisms and typical applications", Mar. 5, 2020, International Journal of Adhesion and Adhesives, vol. 99, p. 102585 (19 pages). (Year: 2020).*

Narkar et al., "pH Responsive and Oxidation Resistant Wet Adhesive based on Reversible Catechol—Boronate Complexation", Chemistry of Materials, 2016, pp. 5432-5439, vol. 28.

Shuttleworth et al., "Switchable adhesives for carpet tiles: a major breakthrough in sustainable flooring", Green Chemistry, May 2010, pp. 798-803, vol. 12:5.

* cited by examiner

PANEL, IN PARTICULAR A FLOOR, CEILING, OR WALL PANEL; A COVERING CONSTRUCTED BY A MULTITUDE OF SUCH PANELS; AND A METHOD FOR THE RECYCLING OF SUCH A PANEL

CROSS-REFERENCE TO RELATED APPLICATIONS

This application is the United States national phase of International Application No. PCT/EP2021/076942 filed Sep. 30, 2021, and claims priority to The Netherlands Patent Application No. 2026580 filed Sep. 30, 2020, the disclosures of which are hereby incorporated by reference in their entireties.

BACKGROUND OF THE INVENTION

Field of the Invention

The present invention relates to a panel, in particular a floor, ceiling, or wall panel, of a planar design having a top side and bottom side, and multiple side edges,
which panel has a structure of laminated layers that are adhered to each other, wherein the laminated layers extend parallel to the plane of the panel, and include:
a core layer having a lower side and an upper side, and
a top layer which is provided on the upper side of the core layer either directly or indirectly.

Description of Related Art

In such a panel, the core layer and the top layer each have different functionalities and therefore the basic material from which these layers are made is often different as well. When such panels after their use are recycled in order to retrieve the basic materials from which they are made, it is thus beneficial when the different materials from the different layers can be recycled via separated streams. A most expedient way to that aim, is to firstly physically separate the laminated layers of the panel from each other, and subsequently recycle the separated types of layers in separated batches.

However, to separate or delaminate the constituting layers of a panel is not a straightforward exercise, as the adhesives that are commonly used in the field, are permanent adhesives such as polyurethane adhesives, which have a high adhesive strength and achieve a durable bonding of the laminated layers which is cumbersome to break. Even when the bonding is broken under the application of high forces, it is in most cases impossible to achieve a clean delamination, i.e. a delamination which perfectly separates the different layers from each other. Consequently, the recycling of the known panels will result in a contaminated stream of recycled material because of the intrinsic imperfect delamination.

In view of the above drawbacks, a general need exists to provide a panel that is more suitable for recycling purposes, which panel comprises durably adhered laminated layers when the panel is used, while the panel also has a feature which allows for a more clean delamination of adhered layers for recycling purposes.

SUMMARY OF THE INVENTION

In order to meet the above general need, the invention proposes in a first aspect thereof, the provision of:

a panel, in particular a floor, ceiling, or wall panel, of a planar design having a top side and bottom side, and multiple side edges,
which panel has a structure of laminated layers that are adhered to each other, wherein the laminated layers extend parallel to the plane of the panel, and include:
a core layer having a lower side and an upper side, and
a top layer which is provided on the upper side of the core layer either directly or indirectly,
wherein at least two layers of the laminated structure, in particular the top layer and the core layer, are directly or indirectly adhered to each other by a switchable adhesive having an adjustable adhesive strength,
wherein the adhesive strength of the switchable adhesive is adjustable from an operational value suitable for the panel during its use, to a reduced value suitable for the panel to be recycled, by exposing the switchable adhesive that is present between the two adhered layers, to:
irradiation, and/or
a thermal treatment, and/or
a solvent, and/or
a Ph modifying agent,
wherein the reduced value of the adhesive strength of the switchable adhesive promotes a clean delamination of the two adhered layers.

In the context of the invention, it has been found possible to significantly reduce the adhesive strength of the two adhered layers at their interface, by exposing the switchable adhesive while it is present between the two adhered layers, to one of the four treatments defined above. Furthermore, it has been found possible to reduce the adhesive strength to such an extent that a delamination of the two adhered layers can be performed without the use of excessive force, and consequently in a clean and virtually perfect way, which results in neither of the two delaminated layers being contaminated with material of the other layer. Consequently, the proposed panel is more suitable for recycling purposes because the improved delamination that is attainable by virtue of the switchable adhesive, allows for the creation of two separated material streams resulting from the two respective delaminated layers, wherein the separate material streams each have an enhanced purity.

In this context, it is preferable that the reduced value of the adhesive strength is 60% or less, preferably 50% or less, more preferably 40% or less, of the operational value.

It has been found that such a level of reduction of the adhesive strength, is particularly effective in order to allow for a clean delamination of the two adhered layers under common practical circumstances.

Additionally, the following preferred configurations of the panel according to the invention, apply:

the planar design is of a rectangular or hexagonal shape;
the panel has a length in the range of 0.40 to 2.0 m, a width in the range of 70 to 180 mm, and an overall thickness of 2 to 20 mm, preferably 3 to 12 mm;
the core layer has a thickness of 2 mm to 7 mm, and/or the top layer has a thickness of 1 mm to 5 mm;
the switchable adhesive has the form of an adhesive layer between the two adhered layers, which adhesive layer is either a continuous or a discontinuous layer.

Preferably, the panel is a decorative panel comprising a decorative top layer. The (decorative) top layer is preferably substantially rigid, which typically results in substantially rigid or semi-flexible panels. The core is preferably substantially rigid, semi-flexible, or flexible. The top layer is preferably water-impermeable to protect the switchable adhesive and the core from water applied to an upper side of the panel e.g. for cleaning purposes. Typically, this circumferential edge of the switchable adhesive layer remains exposed to the surrounding atmosphere and is not protected by the top layer. In this respect, it is preferable that the switchable adhesive is free of starch, as starch has a poor water resistance. Preferably, the switchable adhesive comprises and/or is based upon polyurethane, more preferably polyurethane with an average molecular weight of from 2,000 to 100,000, as polyurethane exhibits a relatively good water-resistance, and since the core and/or top layer are more and more at least partially composed and/or at least partially based upon polyurethane. This latter not only facilitates bonding in case a polyurethane based adhesive is used, but also allows adhesive residue to remain present on the core and/or on the top layer after delamination. In this manner, unintentional delamination during wettening the of the panel can be prevented. Preferably, the switchable adhesive is solvent-free.

Preferably, the panels according to the invention are interconnectable panels. To this end, each panel preferably comprises at least one pair of two opposite side edges which are provided with respective interconnecting profiles that are complementary to each other, such as a tongue and a groove profile, allowing adjacent panels to be interconnected, wherein the interconnecting profiles are preferably configured to realize both a horizontal and vertical locking effect. A horizontal locking effect is a locking effect within the plane defined by the panel, whereas a vertical locking effect is a locking effect perpendicular to said plane defined by the panel. In particular it is preferred that the interconnecting profiles are provided as an integral part of the core layer of the panel. It is further preferred in this context, that the interconnecting profiles allow for a coupling of two panels by a vertical and/or an angling movement of the respective side edges. Preferably, a first pair of opposing sides edges comprises interconnecting profiles configured to allow adjacent panels to be coupled by means of a vertical movement, also referred to as a downward movement, fold-down movement, or drop-down movement. Preferably, a second pair of opposing sides edges comprises interconnecting profiles configured to allow adjacent panels to be coupled by means of an angling down movement.

It is noted that in view of the above preferred dimensions of the panel, the panel has a satisfactory suitability for recycling purposes, both in regard of the process of cleanly delaminating the two adhered layers, as well as in regard of performing one of the treatments to which the switchable adhesive is exposed while it is present between the two adhered layers.

In the panel according to the invention, it is preferable that the switchable adhesive comprises non-reacted unsaturated compounds and/or one or more polymers having non-reacted unsaturated groups, in particular a pressure sensitive adhesive (PSA) and especially a methacrylate functionalized PSA, and preferably the adhesive strength of the switchable adhesive is adjustable by exposure to irradiation.

Switching the switchable adhesive by irradiation results in a relatively simple, clean, and solvent free process. Suitable irradiation sources are e.g. halogen lamps (preferably with a wavelength smaller than 700 nm), LED lamps, and microwave generators. The time of irradiation is typically a couple of seconds, such as 2-4 seconds. The power of the irradiation source may vary, but is preferably at least 500 Watt. Before switching the bond strength of the switchable adhesive is typically between 25 and 40 N/mm2, while after switching the bond strength is preferably less than 1 N/mm2. Preferably, the top layer is at least partially permeable for radiation generated by said irradiation source.

Adhesives which comprise non-reacted unsaturated compounds, or polymers having non-reacted unsaturated groups, are prone to cross-linking under exposure to irradiation by light, including UV-light. The cross-linking leads to a further hardening of the adhesive, which results in a reduction of the adhesive strength. Dependent on the circumstances, a reduction up to 90% is achievable.

Particular examples of adhesives that are suitable for the invention, are pressure sensitive adhesives (PSA's), especially methacrylate functionalized PSA, i.e. having non-reacted vinyl groups that are prone to cross-linking. An additional, main property of the PSA useful in the invention, is that it has a viscous state when the adhesive bond has been formed. The viscosity of the PSA largely determines the maximum adhesive strength that is obtainable.

A suitable formulation for the PSA in the context of the invention, comprises a base adhesive polymer, non-reacted unsaturated compounds or an adhesive polymer having non-reacted unsaturated groups, and optionally a photo-initiator for enhancing the reaction of unsaturated groups upon irradiation. The quantity of photo-initiator present in the switchable adhesive is preferably in the range of 0.04 to 10% by weight of the switchable adhesive.

The base adhesive polymer may comprise a polyacrylate, polyurethane and/or polysilicon. The non-reacted unsaturated compounds may comprise an acrylic acid ester or methacrylic acid ester of an alcohol, glycol, glycerol, epoxide, urethane, silicone, polyester and polyether. The adhesive polymer having non-reacted unsaturated groups, may comprise any type of acryl functionalized polymer.

The PSA may be applied as an aqueous dispersion or can be produced as a solvent-free adhesive (so-called pressure sensitive melts).

It is further preferred in the panel according to the invention, that the switchable adhesive comprises admixed crystallisable polymers which are prone to undergo a phase transition upon heating, such that the adhesive strength of the switchable adhesive is adjustable by exposure to a thermal treatment.

Adhesives having admixed crystallisable polymers, are prone to undergo phase transitions when they are heated, which affects the physical-chemical properties of the adhesive. After heating, the adhesive strength of such an adhesive can be significantly reduced up to about 90%.

According to another preferred embodiment of the panel according to the invention, the switchable adhesive comprises one or more polymers having functional groups which are polar, such as methacrylic polymers, including poly (methyl methacrylate), and the adhesive strength of the switchable adhesive is adjustable by exposure to a Ph modifying agent.

Some water-based adhesives can be switched on and off by changing the Ph of the adhesive. For instance methacrylic polymers, including poly(methyl methacrylate), have an adhesive strength which declines significantly when the Ph of the adhesive is brought below 3, and to such an extent that the adhesive strength may be reduced by 90% or more.

The reduction of the adhesive strength in this context can thus be induced by contacting the adhesive layer with an appropriate acid.

In a further preferred embodiment of the panel according to the invention, the switchable adhesive comprises binary polymeric brushes, and the adhesive strength of the switchable adhesive is adjustable by exposure to a solvent.

Adhesives based on binary polymer brushes which mutually interlock with another, have an adhesive strength that is dependent on the polarity of the solvent in which they are applied. A large difference in adhesive strength has for instance been observed when the adhesive is present in an apolar organic solvent such as toluene, as opposed to a polar solvent such as acidic water.

The reduction of the adhesive strength in this context can thus be induced by contacting the adhesive layer with an appropriate solvent which changes the interactions of the polymer brushes significantly.

Preferably, the reduced value of the adhesive strength of the switchable adhesive is at most 80%, preferably at most 60%, more preferably at most 40%, of the operational value of the adhesive strength of the switchable adhesive.

In the panel according to the invention, it is particularly preferred that the top layer comprises a decorative layer which is visible at the top side of the panel, and which preferably comprises a polymeric material. The decorative layer is preferably a (digitally) printed decorative layer, and is typically composed of a paper or polymer layer onto which ink is (digitally) printed.

Further preferred in the panel according to the invention, is that the top layer comprises at least one wear layer, which is preferably of transparent quality and/or comprises a polymeric material. Typically a top surface of the wear layer is covered by a top coating and/or lacquer layer, which may also be considered to make part of the (laminated) top layer. Both the wear layer and the top coating are transparent and/or translucent layers to secure that the decorative layer is visible as seen from a top view of the panel.

Preferably, the top layer is provided with recesses, preferably a pattern of recesses. This recesses may e.g. be grooves, cavities, or alternative indentations. Preferably, at least a part of the recesses is aligned in register with at least a part of at least one decor image formed by the decorative layer. By applying an alignment in register, also referred to as embossing in register, a very realistic and/or artistic design and appearance of the panel can be realized. The décor image may be formed by a wood pattern. However, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts. Here, the top layer may also comprise thickened zones and/or protrusions, to realize a more realistic look-and-feel appearance. Preferably, the recesses cover at least 25%, preferably at least 35% of the total surface area of the upper side of the panel. Apart from the fact that these, preferably position-selectively applied, recesses, in particular in case these are aligned in register with the décor image of the decorative layer, leads to an improved appearance of the panel, these recesses also create weakened zones in the top layer which facilitate switching the switchable adhesive by irradiation directly underneath said recesses. This only leads to an energy saving as less power is required to reach (irradiate) and consequently to switch the switchable adhesive.

It is imaginable that the switchable adhesive covers only a portion of facing surfaces of said two layers adhered to each other by said adhesive, and wherein a remaining portion of said facing surfaces is free of the switchable adhesive. This means that the switchable adhesive does not cover the entire contact surface of two layer, but only a part thereof. This saves material, and moreover facilitates delamination as less adhesive will have to be switched. Said portion where the switchable adhesive is present, preferably comprises a plurality of zones, wherein adjacent zones may be interconnected and/or wherein adjacent zones may positioned at a distance from each other, wherein said zones together preferably define a pattern, in particular a grid pattern. Preferably, the zones are position-selectively (rather than randomly) applied, more preferably in a predefined manner. Preferably, the one or more adhesive zones define(s) a pattern. Typically, the one or more remaining (non-adhesive) zones define(s) a complementary pattern. The pattern defined by the adhesive zones may, for example, define a grid and/or a matrix pattern and/or a dotted pattern. It is imaginable that at least one zone(s) is/are formed by a plurality of interconnected or intersecting line segments, wherein adjacent line segments mutually enclose an angle (between 0 and 180 degrees). Here, it is imaginable that at least two line segments are interconnected, but not intersecting, which could, for example, lead to the shape of one of the following characters: W, E, T, Y, F, H, K, L, Z, V, N, M. However, it is also conceivable that at least two line segments are intersecting, which would result in a shape of, for example, one of the following characters: +, X, *, #. A combination of intersecting line segments and interconnected, but not intersecting line segments, is also imaginable. A pattern composed of a plurality of broken lines (dashed lines or line segments or dotted lines) can be applied. In this pattern, preferably the broken lines are mutually essentially oriented in parallel, but may also define, for example, a matrix shape. Alternative, the one or more intermediate zones may have, for example, a curved shape, such as a circular shape and/or oval shape and/or elliptic shape, and/or may have a polygonal shape, such as a square shape, rectangular shape, or triangular shape.

Preferably, the abovementioned adhesive zones are at least partially aligned in register with at least a part of the recesses applied in the top layer. In this manner, less switchable adhesive will have to be used, which is moreover relatively easy to switch due to the thinned top layer directly above said adhesive zones. Hence, preferably the zones of switchable adhesive are at least partially positioned underneath the recesses applied in the top layer.

In a special embodiment of the panel according to the invention, the laminated layers of the panel further include a backing layer that is directly or indirectly provided on the lower side of the core layer, and is directly or indirectly adhered on the core layer by the switchable adhesive.

It is particularly preferred in the panel according to the invention, that the core layer comprises a polymeric material, for instance polyurethane or a polymeric mixture including polyurethane.

A further preferred embodiment of the panel according to the invention, features that the core layer comprises a polymeric material which is a mixture of recycled polymeric material and virgin polymeric material.

It is preferred in the panel according to the invention, that the panel comprises two opposite side edges which are provided with respective interconnecting profiles that are complementary to each other, such as a tongue and a groove profile.

Such a design of the panel, allows for the construction of a covering of a multitude of adjacent panels that are interconnected to each other by virtue of the interconnecting profiles.

It is further preferred in this context, that the interconnecting profiles allow for a coupling of two panels by a vertical and/or an angling movement of the respective side edges.

A second aspect of the invention relates to a floor, ceiling, or wall covering constructed by a multitude of adjacent panels according to the first aspect of the invention.

A third aspect of the invention relates to a method for the recycling of a panel after being used, which panel is defined according to the first aspect of the invention, wherein the method comprises the consecutive steps of:
  i. exposing the switchable adhesive at the interface of the two adhered layers of the panel to irradiation, a thermal treatment, a solvent, OR a pH modifying agent, in order to adjust the adhesive strength to a reduced value which is suitable for the panel to be recycled;
  ii. delaminating the two adhered layers from each other.

It is preferable that the method according to invention, further comprises a subsequent step of:
  iii. recycling the two delaminated layers in separate streams.

Preferably, during step i. the switchable adhesive is exposed to irradiation by using a halogen radiation source or LED radiation source. Here, the switchable adhesive can for example by irradiated with a light intensity of 10,000-15,000 lux from a 400-600 Watt halogen lamp having a broad spectrum. Alternatively, or additionally, during step i. the switchable adhesive is exposed to irradiation by using a microwave radiator with a typically power of 800-1000 Watt, and preferably configured to generate irradiation with a frequency of 2.4 GHz.

Preferred embodiments of the invention are set out in the non-limitative set of clauses presented below.

CLAUSES

1. Panel, in particular a floor, ceiling, or wall panel, of a planar design having a top side and bottom side, and multiple side edges,
   which panel has a structure of laminated layers that are adhered to each other, wherein the laminated layers extend parallel to the plane of the panel, and include:
   a core layer having a lower side and an upper side, and
   a top layer which is provided on the upper side of the core layer either directly or indirectly,
   wherein at least two layers of the laminated structure, in particular the top layer and the core layer, are directly or indirectly adhered to each other by a switchable adhesive having an adjustable adhesive strength,
   wherein the adhesive strength of the switchable adhesive is adjustable from an operational value suitable for the panel during its use, to a reduced value suitable for the panel to be recycled, by exposing the switchable adhesive that is present between the two adhered layers, to:
   irradiation,
   a thermal treatment,
   a solvent, OR
   a pH modifying agent,
   wherein the reduced value of the adhesive strength of the switchable adhesive promotes a clean delamination of the two adhered layers.
2. Panel according to clause 1, wherein the reduced value of the adhesive strength is 60% or less, preferably 50% or less, more preferably 40% or less, of the operational value.
3. Panel according to one of the preceding clauses, wherein the planar design is of a rectangular or hexagonal shape.
4. Panel according to one of the preceding clauses, wherein the panel has a length in the range of 0.40 to 2.0 m, a width in the range of 70 to 180 mm, and an overall thickness of 2 to 20 mm, preferably 3 to 12 mm.
5. Panel according to one of the preceding clauses, wherein the core layer has a thickness of 2 mm to 7 mm, and/or the top layer has a thickness of 1 mm to 5 mm.
6. Panel according to one of the preceding clauses, wherein the switchable adhesive has the form of an adhesive layer between the two adhered layers, which adhesive layer is either a continuous or a discontinuous layer.
7. Panel according to one of the preceding clauses, wherein the switchable adhesive comprises non-reacted unsaturated compounds and/or one or more polymers having non-reacted unsaturated groups, in particular a pressure sensitive adhesive (PSA), especially a methacrylate functionalized PSA, and preferably the adhesive strength of the switchable adhesive is adjustable by exposure to irradiation.
8. Panel according to one of the preceding clauses, wherein the switchable adhesive comprises admixed crystallisable polymers which are prone to undergo a phase transition upon heating, such that the adhesive strength of the switchable adhesive is adjustable by exposure to a thermal treatment.
9. Panel according to one of the preceding clauses, wherein the switchable adhesive comprises one or more polymers having functional groups which are polar, such as methacrylic polymers, including poly(methyl methacrylate), and the adhesive strength of the switchable adhesive is adjustable by exposure TO a pH modifying agent.
10. Panel according to one of the preceding clauses, wherein the switchable adhesive comprises and/or is based upon polyurethane wherein said polyurethane has an average molecular weight of from 2,000 to 100,000.
11. Panel according to one of the preceding clauses, wherein the switchable adhesive comprises binary polymeric brushes, and the adhesive strength of the switchable adhesive is adjustable by exposure to a solvent.
12. Panel according to one of the preceding clauses, wherein the switchable adhesive comprises at least one photo-initiator, preferably in the range of 0.04 to 10% by weight of the switchable adhesive.
13. Panel according to one of the preceding clauses, wherein the reduced value of the adhesive strength of the switchable adhesive is at most 80%, preferably at most 60%, more preferably at most 40%, of the operational value of the adhesive strength of the switchable adhesive.
14. Panel according to one of the preceding clauses, wherein the top layer is at least partially permeable for irradiation used to switch the switchable adhesive.
15. Panel according to one of the preceding clauses, wherein the switchable adhesive is solvent-free.
16. Panel according to one of the preceding clauses, wherein the switchable adhesive covers only a portion of facing surfaces of said two layers adhered to each other by said adhesive, and wherein a remaining portion of said facing surfaces is free of the switchable adhesive.
17. Panel according to clause 16, wherein the switchable adhesive covers only a portion of facing surfaces of said two layers adhered to each other by said adhesive, and wherein said portion comprises a plurality of zones, wherein adjacent zones may be interconnected and/or wherein adjacent zones may positioned at a distance from each other, wherein said zones together preferably define a pattern, in particular a grid pattern.
18 Panel according to one of the preceding clauses, wherein the top layer is provided with recesses, preferably a pattern of recesses.
19. Panel according to one of the preceding clauses, wherein the top layer is provided with recesses, preferably a pattern of recesses, which at least partially follow a decorative pattern of a decorative printed layer of the top layer.
20. Panel according to clause 18 or clause 19, wherein the recesses cover at least 25%, preferably at least 35% of the total surface area of the upper side of the panel.
21. Panel according to clause 17 and one of clauses 18-20, wherein the zones of switchable adhesive are at least partially positioned underneath the recesses applied in the top layer.
22. Panel according to one of the preceding clauses, wherein the entire top layer is substantially rigid.
23. Panel according to one of the preceding clauses, wherein the top layer comprises a decorative layer which is visible at the top side of the panel, and which preferably comprises a polymeric material.
24. Panel according to one of the preceding clauses, wherein the top layer comprises a wear layer, which is preferably of transparent quality and/or comprises a polymeric material.
25. Panel according to one of the preceding clauses, wherein the laminated layers of the panel further include a backing layer that is directly or indirectly provided on the lower side of the core layer, and is directly or indirectly adhered on the core layer by the switchable adhesive.
26. Panel according to one of the preceding clauses, wherein the core layer comprises a polymeric material, for instance polyurethane or a polymeric mixture including polyurethane.
27. Panel according to one of the preceding clauses, wherein the core layer comprises a polymeric material which is a mixture of recycled polymeric material and virgin polymeric material.
28. Panel according to one of the preceding clauses, wherein at least the core layer and the top layer, and preferably each of the laminated layers of the panel, comprise a polymeric material, which is based on polyurethane or a polymeric mixture including polyurethane, and wherein the switchable adhesive is based on polyurethane or a polymeric mixture including polyurethane.
29. Panel according to one of the preceding clauses, wherein the panel comprises two opposite side edges which are provided with respective interconnecting profiles that are complementary to each other, such as a tongue and a groove profile.
30. Panel according to clause 29, wherein the interconnecting profiles allow for a coupling of two panels by a vertical and/or an angling movement of the respective side edges.
31. Panel according to one of the preceding clauses, wherein the switchable adhesive is free of starch.
32. Panel according to one of the preceding clauses, wherein the top structure is provided with weakened zones facilitating position-selective irradiation of the switchable adhesive.
33. Panel according to one of the preceding clauses, wherein the panel is a decorative panel, and wherein the top layer is a decorative top layer.
34. Panel according to one of the preceding clauses, wherein the top layer is a rigid top layer.
35. Panel according to one of the preceding clauses, wherein the top layer comprises a laminate of sublayers comprising at least one decorative printed layer, and at least one translucent and/or transparent protective layer covering said decorative printed layer.
36. Panel according to one of the preceding clauses, wherein the panel comprises at least one pair of two opposite side edges which are provided with respective interconnecting profiles that are complementary to each other, such as a tongue and a groove profile, which are preferably configured to realize both a horizontal and vertical locking effect.
37. Panel according to clause 36, wherein the interconnecting profiles allow for a coupling of two panels by a vertical and/or an angling movement of the respective side edges.
38. Panel according to clause 36 or 37, wherein the panel comprises two pairs opposite side edges, wherein each pair of opposite edges is provided with respective interconnecting profiles that are complementary to each other, such as a tongue and a groove profile.
39. Floor, ceiling, or wall covering constructed by a multitude of adjacent panels according to one of the preceding clauses.
40. Method for the recycling of a panel after being used, which panel is defined according to one of the preceding clauses, wherein the method comprises the consecutive steps of:
i. exposing the switchable adhesive at the interface of the two adhered layers of the panel to irradiation, a thermal treatment, a solvent, OR a pH modifying agent, in order to adjust the adhesive strength to a reduced value which is suitable for the panel to be recycled;
ii. delaminating the two adhered layers from each other.
41. Method according to clause 40, further comprising a subsequent step of:
iii. recycling the two delaminated layers in separate streams.
42. Method according to clause 40 or 41, wherein during step i. the switchable adhesive is exposed to irradiation by using a halogen radiation source of LED radiation source.
43. Method according to one of clauses 40-42, wherein during step i. the switchable adhesive is exposed to irradiation by using a microwave radiator, preferably configured to generate irradiation with a frequency of 2.4 GHz.

BRIEF DESCRIPTION OF THE DRAWINGS

The invention will be further elucidated with reference to preferred embodiments of the invention that are shown in the appended figures, wherein.

DESCRIPTION OF THE INVENTION

Figure 1:
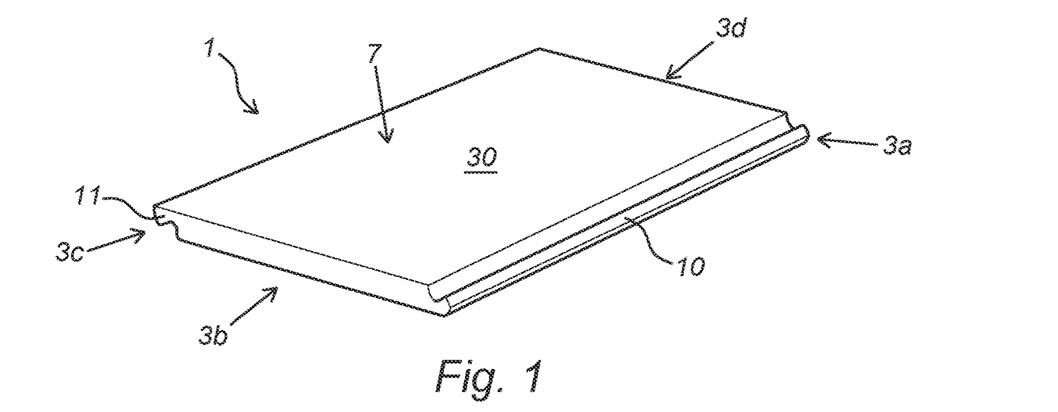
FIG. 1 shows in perspective a panel according to the invention.

FIG. 1 shows a panel 1 suitable as a floor, ceiling or wall panel, which panel is of a planar design having an top side 7, a bottom side and side edges 3a-d which comprise a first side edge 3a provided with a first profile 10 and a second side edge 3c provided with a second profile 11. A top layer 30 is present at the top side 7 of the panel.

Figure 2:
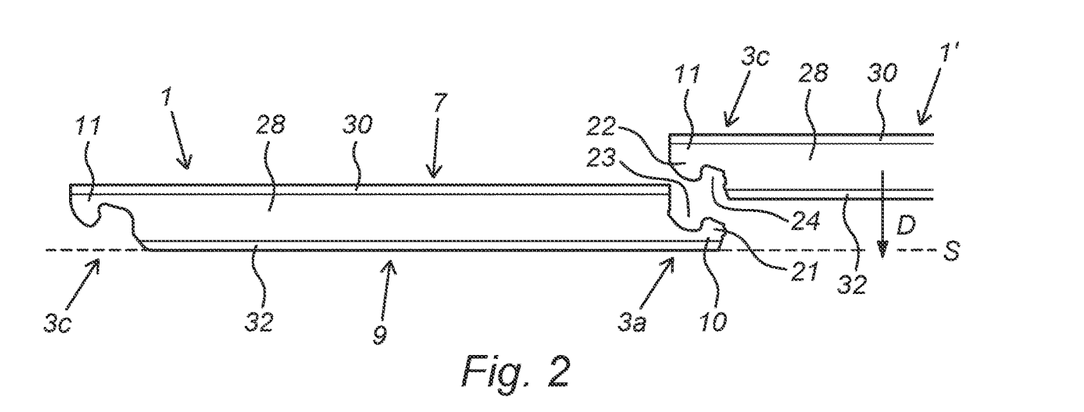
FIG. 2 shows a cross-sectional view of two panels and their coupling profiles according to the invention.

FIG. 2 shows a cross-section of the panel 1 of FIG. 1, perpendicular to the first and second side edges 3a and 3c, which are provided with a first profile 10 and a second profile 11. The bottom side 9 of the panel 1, is laid on a substrate layer for instance a floor surface S.

The panel 1 has a structure of laminated layers 28, 30 and 32 that are adhered to each other, which layers extend parallel to the plane of the panel 1, and comprise:
a core layer 28 having a lower side and an upper side,
a top layer 30 which is adhered on the upper side of the core layer by a switchable adhesive according to the invention, and
a backing layer 32 which is adhered on the lower side of the core layer by a switchable adhesive according to the invention.

Further in FIG. 2, another identical panel 1' is shown in part, of which the second side edge 3c is to be coupled to the panel 1, by a downward vertical movement indicated by vector D.

The first profile 10 and the second profile 11 of both panels 1 and 1' are mutually interacting profiles that can be coupled to each other and are complementary to each other. During coupling, the second profile 11 of panel 1' is vertically inserted in the first profile 10 of panel 1, which involves the downward tongue 22 of panel 1' being inserted in the first groove 23 of panel 1, and the upward tongue 21 of panel 1 being inserted in the second groove 24 of panel 1'. When coupled, the panels 1 and 1' lie in a common plane which is parallel to the floor surface S.

Figure 3:
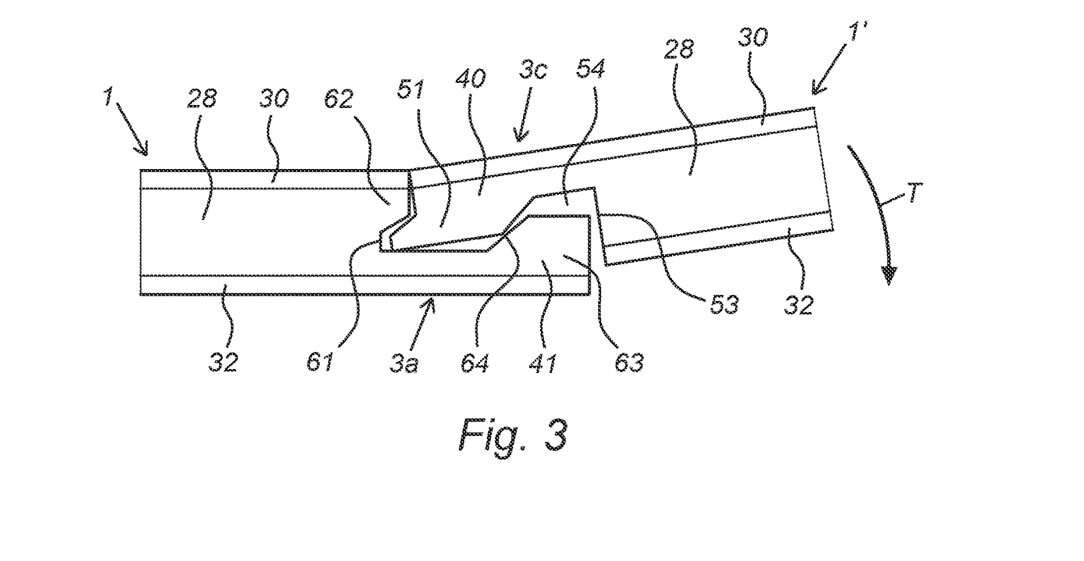
FIG. 3 shows a cross-sectional view of two panels having alternative coupling profiles according to the invention.

FIG. 3 shows analogous to FIG. 2, alternative coupling profiles 40 and 41 for connecting two panels 1 and 1' with each other. Features that are equal to the features of FIG. 2 are indicated by the same reference numerals.

The first profile 40 of panel 1', comprises a sideward tongue 51 extending in a direction substantially parallel to the upper side of the panel, one downward flank 53 lying at a distance from the sideward tongue 51, and a downward groove 54 formed between the sideward tongue 51 and the downward flank 53.

The second profile 41 of panel 1, comprises a groove 61 configured for accommodating at least a part of the sideward tongue 51 of the first profile 40 of a second identical panel 1', said groove 61 being defined by an upper lip 62 and a lower lip 63, wherein said lower lip is provided with an upward locking element 64.

In the situation shown in FIG. 3, the first coupling profile and the second coupling profile 6 are configured such that the respective panels 1 and 1', can be coupled to each other by means of a turning movement as indicated by arrow T, which involves the sideward tongue of panel 1' being inserted into the third groove of the other identical panel 1, wherein the upward locking element 64 of the panel 1, is inserted into the second downward groove 54 of the panel 1'.

It is also envisaged by the invention, that coupling profiles 40 and 41 are provided on the side edges 3b and 3d, while the side edges 3a and 3c are provided with alternative coupling profiles 10 and 11 as shown in FIG. 2.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel of a planar design having a top side and bottom side, and multiple side edges,
the panel has a structure of laminated layers that are adhered to each other, wherein the laminated layers extend parallel to the plane of the panel, and comprise:
- core layer having a lower side and an upper side, and
a substantially rigid, decorative top layer which is provided on the upper side of the core layer either directly or indirectly,
wherein the panel comprises at least one pair of two opposite side edges which are provided with respective interconnecting profiles that are complementary to each other,
wherein at least two layers of the laminated structure, are directly or indirectly adhered to each other by a switchable adhesive having an adjustable adhesive strength,
wherein the switchable adhesive is free of starch,
wherein the adhesive strength of the switchable adhesive is adjustable from an operational value suitable for the panel during its use, to a value suitable for the panel to be recycled, by exposing the switchable adhesive that is present between the two adhered layers to irradiation,
wherein the value of the adhesive strength of the switchable adhesive promotes a clean delamination of the two adhered layers, and
wherein the top layer is at least partially permeable for irradiation used to switch adjust the strength of the switchable adhesive.

2. The panel according to claim 1, wherein the value suitable for the panel to be recycled of the adhesive strength is 60% or less of the operational value.

3. The panel according to claim 1, wherein the switchable adhesive is an adhesive layer between the two adhered layers, wherein the adhesive layer is either a continuous or a discontinuous layer.

4. The panel according to claim 1, wherein the switchable adhesive comprises non-reacted unsaturated compounds and/or one or more polymers having non-reacted unsaturated groups.

5. The panel according to claim 1, wherein the switchable adhesive comprises admixed crystallisable polymers which are prone to undergo a phase transition upon heating, such that the adhesive strength of the switchable adhesive is adjustable by exposure to a thermal treatment.

6. The panel according to claim 1, wherein the switchable adhesive comprises one or more polymers having functional groups which are polar comprising, methacrylic polymers, including poly (methyl methacrylate), and the adhesive strength of the switchable adhesive is adjustable by exposure to a pH modifying agent.

7. The panel according to claim 1, wherein the switchable adhesive comprises and/or is based upon polyurethane wherein said polyurethane has an average molecular weight of from 2,000 to 100,000.

8. The panel according to claim 1, wherein the switchable adhesive comprises binary polymeric brushes, and the adhesive strength of the switchable adhesive is adjustable by exposure to a solvent.

9. The panel according to claim 1, wherein the switchable adhesive comprises at least one photo-initiator.

10. The panel according to claim 1, wherein the value of the adhesive strength of the switchable adhesive is at most 80% of the operational value of the adhesive strength of the switchable adhesive.

11. The panel according to claim 1, wherein the switchable adhesive is solvent-free.

12. The panel according to claim 1, wherein the switchable adhesive covers only a portion of facing surfaces of said two layers adhered to each other by said adhesive, and wherein a remaining portion of said facing surfaces is free of the switchable adhesive.

13. The panel according to claim 1, wherein the top layer is provided with recesses.

14. The panel according to claim 1, wherein the top layer comprises a decorative layer which is visible at the top side of the panel, and wherein the top layer comprises a wear layer.

15. The panel according to claim 1, wherein the laminated layers of the panel further comprise a backing layer that is directly or indirectly provided on the lower side of the core layer, and is directly or indirectly adhered on the core layer by the switchable adhesive.

16. The panel according to claim 1, wherein the core layer comprises a polymeric material comprising, polyurethane or a polymeric mixture including polyurethane.

17. The panel according to claim 1, wherein the interconnecting profiles comprise a tongue and a groove profile.

18. A floor, ceiling, or wall covering constructed by a multitude of adjacent panels according to claim 1.

19. A method for recycling a panel after being used, the panel is defined according to claim 1, wherein the method comprises consecutive steps of:
  i. exposing the switchable adhesive at an interface of the two adhered layers of the panel to irradiation in order to adjust the adhesive strength of the switchable adhesive to a value which is suitable for the panel to be recycled and;
  ii. delaminating the two adhered layers from each other.

20. The method according to claim 19, further comprising a subsequent step of:
  recycling the two delaminated layers in separate streams.

21. The method according to claim 19, wherein during step i. the switchable adhesive is exposed to irradiation by using a halogen radiation source of LED radiation source and/or a microwave radiator.

22. The method according to claim 19, wherein the step of exposing the switchable adhesive at the interface of the two adhered layers of the panel comprises exposing the switchable adhesive to at least one of a thermal treatment, a solvent, and a pH modifying agent.

* * * * *

UNITED STATES PATENT AND TRADEMARK OFFICE
CERTIFICATE OF CORRECTION

| | | |
|---|---|---|
| PATENT NO. | : 12,280,581 B2 | Page 1 of 1 |
| APPLICATION NO. | : 18/029295 | |
| DATED | : April 22, 2025 | |
| INVENTOR(S) | : Eddy Alberic Boucké | |

It is certified that error appears in the above-identified patent and that said Letters Patent is hereby corrected as shown below:

On the Title Page

Item [71], Line 1, delete "Hamont-Achel" and insert -- Turnhout --

In the Claims

Column 12, Line 29, Claim 1, delete "- core" and insert -- a core --

Column 12, Line 37, Claim 1, delete "structure," and insert -- structure --

Column 12, Line 50, Claim 1, delete "to switch" and insert -- to --

Column 13, Line 4, Claim 6, delete "poly (methyl methacrylate)," and insert -- poly(methyl methacrylate), --

Signed and Sealed this
Seventeenth Day of June, 2025

Coke Morgan Stewart
*Acting Director of the United States Patent and Trademark Office*